United States Patent [19]

Griebel et al.

[11] Patent Number: 5,496,879
[45] Date of Patent: Mar. 5, 1996

[54] PRINTING INK

[75] Inventors: Rudolf Griebel, Siegburg; Karl A. Kocherscheid, Hennef-Dondorf; Klaus Stammen, Lohmar, all of Germany

[73] Assignee: Siegwerk Druckfarben GmbH & Co. KG, Siegburg, Germany

[21] Appl. No.: 22,338

[22] Filed: Feb. 24, 1993

[30] Foreign Application Priority Data

Feb. 25, 1992 [DE] Germany ............... 42 05 713.2

[51] Int. Cl.$^6$ .............. C08K 5/09; C08K 5/05; C08L 29/04; C08L 33/04
[52] U.S. Cl. ............ 524/320; 524/385; 524/557; 524/558; 523/160
[58] Field of Search ................ 523/160, 161; 524/557, 558, 320, 385; 101/488; 106/27

[56] References Cited

U.S. PATENT DOCUMENTS

| | | | |
|---|---|---|---|
| 2,264,315 | 12/1941 | Jones | 106/26 A |
| 4,069,179 | 1/1978 | Jones | 524/385 |
| 4,267,000 | 5/1981 | Dix et al. | 523/160 |
| 4,426,227 | 1/1984 | Keeling et al. | 523/160 |
| 4,812,354 | 3/1989 | Sugiyama et al. | 428/195 |

FOREIGN PATENT DOCUMENTS

| | | |
|---|---|---|
| 067663B1 | 10/1985 | European Pat. Off. . |
| 206286A1 | 12/1986 | European Pat. Off. . |
| 266526A1 | 5/1988 | European Pat. Off. . |
| 307933A2 | 3/1989 | European Pat. Off. . |
| 2426849A1 | 1/1975 | Germany . |
| 2534845 | 2/1977 | Germany . |
| 2534845A1 | 2/1977 | Germany . |
| 2635226A1 | 2/1978 | Germany . |
| 3101243A1 | 7/1982 | Germany . |
| 3138881A1 | 8/1982 | Germany . |
| 3524031A1 | 1/1987 | Germany . |
| 3625592A1 | 2/1987 | Germany . |
| 119798 | 5/1990 | Japan . |
| 4018393 | 1/1992 | Japan . |
| 92075381 | 1/1992 | Japan . |
| 1015926 | 7/1962 | United Kingdom . |
| 1510190 | 5/1978 | United Kingdom ....... 524/558 |
| WO9118065 | 11/1991 | WIPO . |

OTHER PUBLICATIONS

Rompp Chemie Lexikon Publication, Georg Thieme Verlag Stuttgart, New York, by Professors Dr. Jurgen Falbe and Dr. Manfred Regitz (vol. A–Cl, H–L, M–Pk, T–Z, and 1990 article) and Dr. Otto–Albrecht Neumuller (1988 article).
Ullmanns Encyklopadie der technischen Chemie, Bands 14 and 24, Verlag Chemie, NY.
Kunststoff–Handbuch Band I (Carl Hanser Verlag Munchen Wien 1975).
Kunststoff–Werkstoffe im Gesprach (BASF Aktiengesellschaft).
Makromolekule, Struktur–Eigenschaften–Synthesen Stoffe (Huthig & Wepf Verlag Basel, Heidelberg).
H. B. Fuller, Technisches Merkblatt—Techical Data Sheet, H. B. Fuller GmbH, Luneburg, Germany.
Article of von Dr. W. Schaezle entitled "Der Schmelzsiebdruck als Schlusseltechnologie! Punktbeschichtung mit Hotmelts im Siebdruckverfanren" (Jun., 1990).
Klebstoff–Monographien Band 4a Schmelzklebstoffe (von Ralf Jordan), Copyright 1985.

*Primary Examiner*—Peter A. Szekely
*Attorney, Agent, or Firm*—Harness, Dickey & Pierce

[57] ABSTRACT

A solid or amorphous printing ink, especially a gravure printing ink, is fused to become printable in a fluidized condition. The ink is fixed on imprint material by solidification by heat extraction or cooling. The ink includes a binder-material having at least two component groups with each having at least one member, of which members of the first component group have the property to act as solvent for the members of the second group of components. The members of the first component group are solid state crystalline materials. The materials are solid at ambient temperature with a relatively low melting point. The members of the second component group are in a vitreous solid or amorphous condition at ambient temperature. These materials, especially polymers, are soluble in the molten first component group.

13 Claims, No Drawings

PRINTING INK

BACKGROUND OF THE INVENTION

The present invention relates to printing inks and more particularly to gravure printing inks. Hence forth in this text, the item "printing ink" means printable materials with actual color-rendering power as well as non coloring lacquers and non coloring printing ink-varnishes.

In prior art rotary printing processes, especially gravure printing processes, a solvent-containing ink is applied to a printing cylinder which is preformed with the desired image to be printed. By impression, which is exerted by an impression-roller, the ink then is transferred to the web, which is running in the narrow gap between the impression roller and the printing cylinder. Finally, the imprinted web is fed into a drying section of the printing machine, where the solvent is removed from the web as well as from the ink-layer, which lies straight on the web or partially penetrates it. The spatial dimensions of those construction elements of the overall printing machine, which are necessary for the particular task of printing itself, are small compared to the spatial demands of the drying section and the construction elements, which are necessary for realization of the drying technology. This holds true especially for the gravure printing process and also for the web-fed offset printing technique.

Hence, a first disadvantage of the prior art printing processes and the printing machines, which achieve drying of the print by forced evaporation of the solvent content of the ink, especially concerning gravure and web-fed offset printing, has to be traced back to the relatively large space requirement of the drying section and the related peripheral construction elements, which are indispensable for drying success. With enhanced printing speeds, the shortening of the drying time per unit length of the running web has to be counteracted by an increasing length of the drying duct and hence by even larger spatial demands of the related machinery.

In the case of rotary gravure printing, the drying section generally includes a manifold of pipes, which are arranged in parallel to the running web. These pipes are equipped with nozzle-arrays, by means of which impinging jets of heated air are blown onto the running web. The high efficiency of heat- and mass-transfer, which has to be established across the boundary, may only be achieved by a highly turbulent field of flow from the impinging jets. This turbulence in turn results from the high blast delivery of the fans, whose intake comes from the surroundings and is heated either actively by means of heat exchange to up to 80° C. if needed, or passively by flow resistance in the ducts to nearly 40° C. or so. With increasing printing speed or machine productivity, the energy-input needed for the drying process must also be increased. This holds true with respect to the mass flow and hence the mechanical power of the fans as well as for the thermal power of heat generation, be it active or passive. In fact, the drying air represents the biggest mass-flow of all materials fed into or leaving a fast running gravure printing machine.

The heat-and mass-transfer, which to a large extent is influencing the production costs is neither physically bound nor constitutional to the print-product like paper or the ink and hence in principle could be dispensable. The high blown and expensive drying periphery of a printing unit, which has been described so far mainly in terms of rotogravure printing, is as essential to a large extend for web-fed offset as well as rotary screen-printing. In web-fed offset printing, the thermal power needed for the drying process is especially high.

Hence, another disadvantage present with printing processes operating with physical evaporation drying is a high expense of power for the forced convection and the thermal input.

For mainly two reasons, only a limited partition of the vapor-carrying drying air may be fed back into the drying duct. The first reason is, that in the course of extensive or nearly complete feedback, the vapor concentration of the then largely unrefreshed drying air would come to saturation and thus the dew-point and hence zero-drying efficiency would be reached. The second reason is, that in the case of ignitable vapors, the lower limit of explosion (LEL) quickly would be reached or even be exceeded. Instead of, an abundant safety-margin should strictly be observed, especially in gravure printing. For economical reasons as well as for environmental considerations, the vapor-carrying air may not be exhausted. Instead of, it is fed into a solvent-recovery plant or subjected to thermal combustion.

The construction components for solvent recovery or combustion impose high demands for space and reach very bulky dimensions in the case of large printing plants. Obviously, the operation of these facilities is also very cost-demanding. The same holds true for thermal combustion.

Thus, a third serious shortcoming of printing processes using solvents and evaporation-drying is the effort and the costs, which have to be spent for solvent recovery or thermal combustion.

In order to increase the efficiency and the economics of the solvent recovery and also in order to ensure the vapor-concentration in the working area falling short of the maximum tolerable working-place concentration, the printing machines as well as the drying equipment and all the related periphery are fully encapsuled. An additional requirement, which has to be met due to the flammability of most solvents fed into printing business, is, that all electrical equipment, which is exposed to solvent vapors inside the printing units or outside in the drying ducts, needs to fulfill the explosion-hazard specifications, which are imposed by law.

SUMMARY OF THE INVENTION

Taking into account the above described solvent-technology and its inherent disadvantages, the invention aims at a type of printing ink, more particularly a type of gravure printing ink, which differs from conventional inks by complete exclusion of volatile and liquid solvents, which have to be removed (by evaporation) in the course of ink-drying. The realization is achieved by providing a printing ink, which is fluidized by melting and heating up to print viscosity and thus becomes printable. In accordance with the invention, ink-drying is reduced to a solidification, which is brought about by cooling the printed ink-layer down to a temperature below its melting- or below its softening point. The technical measure to be taken, simply is to pass the web across a cooling roller, immediately after it left the impression stage. The space requirement of such a cooling device is minimal in comparison to the prior art drying sections described above.

Usually, printing inks are made up by polymers as binding agents (binders) for the color-rendering components within the ink and also are made up by special additives, which influence the decisive specification of the inks according to their field of application.

The German disclosure DE 2534845/A1 discloses unblended simple thermo-plastics to act as binders in a hot-melt-printing ink with softening points from 90° to 140° C. However, thermoplastics, especially those of the polyamide-type named by the aforementioned DE 2534845/A1, are characterized by high-ranging and broad-band softening temperatures. Hence, this published type of hot-melt ink comes down to a reliable print-viscosity at very elevated temperatures only, which are not readily accessible in printing business.

Clearly contrasting this and according to the present invention, it is preferred to provide such binding agents by use of at least two groups of components, which are made up by one member each at least. The members of a first group of components are solid too and are designed to act as solvents for the members of the second group at moderately elevated temperatures. Thus, there is an advantage to achieve a ready-to-print-viscosity of the second group binders at a comparatively low temperature-interval, that means at the melting point of this first groups's members. Thus, above the melting point of a first component, a mixture of both groups with at least one member each, makes up a homogeneous fluid binding phase.

Preferably, further advance is made by the following design of the members of the component-groups: The members or at least the optionally single representative of the first group of components is a chemical individual with solid crystalline property at the usual temperatures of use of printed products. At temperatures above its melting point, the typically sudden breakdown of crystallinity of the first group's member(s) is able to provide for a high enough fluidity within a comparatively narrow interval of temperature, centered around the fusion point, and at the same time for a high dissolving power with concern to the member(s) of the binding second group. The members or at least the optionally single representative of the second group of binding components are amorphous polymers with binding property, which—although remaining non-fluid at the sharp fusion-interval of the first crystalline component(s) for themselves, are readily dissolved in the fused first component(s). Thus, the disadvantages, which are inherently connected to the evaporation of liquid solvents off the ink by thermal convection-drying, no longer apply to the "drying"-process of the present invention's printing inks, which have been printed in a fused and fluidized state and which are solidified after having been transferred to the web by merely cooling down below the melting point of the crystalline member(s) of the first group of components.

An especially preferable design of a printing ink for the above described "drying" mechanism excels by using binder-polymers, i.e. members of the second group of components, which, at one hand, separate from the fused solution mixture as an amorphous precipitate at temperatures above the melting point of the members of the first group, and at the other hand, thereby dissolve these yet fused first group-members to a solid solution within the own amorphous network. In the course of this "drying"- or solidification-mechanism, the members of the first group of components reappear as a solid solution and are in fact unable to recrystallize, because diffusion is no longer possible in the resulting solid solution. While the temperatures vary depending on the members selected, in one example of the fused solution mixture of at least one member from component groups 1 and 2, the melting point of the members of the first component group takes place at approximately 80° C. and the precipitation temperature of the members of the second component group is approximately 100° C.

This particular design, together with a suitable choice of members of the first group, allows for ink layers, which are internally softened instantaneously after precipitation on the web. The same mechanism also allows to generate a very fine or even molecular dispersion of special additives during the course of precipitation, which in turn may favorably influence succeeding stages of the print procedure or other qualities of application of the printed product. For example, a member of the first component group or a further component may be chosen which enhances sliding friction. Or, for another example, if a member of the first group of components is chosen to be a solid lubricant if finely dispersed, a printed product is achieved, which does not suffer surface scars and damage by mechanical influences and hence is particularly well suited for passing through succeeding mechanical processing elements. Amongst others, such mechanical elements may be guiding rollers, folders, page-assemblers, palletizers and so on. Further examples of postprocessing with mechanical surface-loading are found in packaging machines.

However, such favorable properties of the print product may also be achieved by additives, which may be members of a possible third group of components within the ink. This optional third group covers other aspects of the ink-performance and does not necessarily exert dissolving action on the members of the second group.

Preferred examples for the chemical individuals within the first group of components are cetyl alcohol, stearyl alcohol, 12-hydroxy-stearic acid or combinations thereof. Preferred examples for the second group of components are commercial telomeric acrylic resins enriched with hydroxy-substituents, partially hydrolyzed polyvinyl-acetates or combinations thereof. A commercial product of the latter type may be a member of the Mowilith series, a trade mark of the Hoechst corporation. Using these materials, a suitable mixture of members of the first and second component group is 1:3.

If heat removal from the printed layer of said ink is done efficiently, the solidification is fast enough to prevent the ink to penetrate the capillaries of the imprinted material like paper-web. This non-penetrating behavior is a further essential advantage of said ink-system as compared to conventional solvent based inks, which have to be made suitable for printing on open qualities of paper stock by implementation of sophisticated additives. Clearly contrasting this, the claimed ink-system readily yields a good gloss effect and a so called smooth ink-lay also on super calendared as well as on open paper stocks.

A typical procedure for manufacturing an ink of the type claimed herewith is distinguished by the following steps, where the detailed operations may be changed however to make sense with particular circumstances.

1. Preparing a mixture of at least one member of each of the first and second component group. Optional addition of further liquid or solid components needed to improve the quality-profile and applicability of the resulting ink.

2. Heating the mixture until a sufficient fluidity has been reached, that means heating at least above the fusion point of the at least one present member of the first component group and even slightly more up to the solution-temperature of the at least one member of the second group in the fusion of the member(s) of the first group.

3. Optional addition of at least one color-rendering component. This may be a soluble dye-stuff as well as an insoluble pigment, if the intention is to manufacture a colored ink or a black ink.

The fluidized combination of 1. and optionally 3. is homogenized by applying the well known techniques of manufacturing paints, lacquers and printing inks. A particularly simple and hence preferred modification, which is applicable in the case of the claimed ink, is to achieve the homogenization as well as the optional dispersion by means of a mixing and dispersing extruder. Before solidification takes place, the homogeneous or the optionally pigmented fusion will be cast in molds or optionally cast as thin foils with widths adapted to the usual width of printing machines. The latter step preferably may be performed also by foil-extrusion. The cast-in-mould is ready for delivery or may be broken down to fragments, granulates or powder. The optional thin foils are coiled to reels and are delivered for direct use at the printing unit.

The application of the claimed ink as printing ink is described as follows.

Coating of a non-fused thin film (foil) of said ink onto a rotating and preferably preheated lithographic (offset) cylinder and fluidizing the ink by selective fusion on the cylinder according to the image-pattern to be printed.

alternatively:

Coating of a viscous film of said ink onto a rotating and preferably preheated gravure-printing cylinder and doctoring the viscous ink, such that it is left as a remainder only in the cells, which are engraved in the cylinder according to the image-pattern.

Transfer of ink to the web by the usual procedure of impression between the impression roller and the selectively inked printing cylinder.

Solidification of ink immediately after the ink comes into contact with the web. Completion of solidification by passing the running web across a cooling-roller.

Apparently, the printing ink described herewith is able to bring about a considerable simplification of the printing process, particularly of the web-fed offset and gravure printing processes, which otherwise are using solvent based types of ink with evaporation-drying. Consequently, the claimed ink system allows for an essential reduction of all constructional elements of the state of the art related to conventional ink drying and solvent recovery.

A first printing technique, which may be executed with said printing ink is a gravure-printing process. The ink, which at ambient temperature (room-temperature) is solid state, is heated to a viscous fluidity and then coated as a thin film on an engraved printing cylinder. Preferably, this cylinder may be preheated. The coated cylinder is doctored by a so called doctor-blade. By this, the ink coating is removed from the non-screened areas on the cylinder, but stays in the screening as long as it is transferred to the web by impression. The ink-layer on the web is then solidified by cooling.

A second printing technique, which may be realized by application of the claimed ink-system, is essentially a lithographic process. The ink, which is solid at room-temperature, but fusible by heat, is coated as a uniform solid film onto a smooth printing cylinder. There, the yet solid ink film is fused into a pixel-pattern according to the screening of the image to be printed. After transfer of these fluidized pixels to the web, they are solidified by cooling. The expression "coated as a uniform solid film" means both the direct application of a premade solid foil of ink and also the application of a viscous semifluid film, which may be made preferably by means of an extruder, and which, if needed will be doctored down to a thin layer. This semifluid film solidifies by contacting the printing cylinder at temperatures below the softening point.

A printing machine which is equipped for the gravure printing process, includes at least one printing unit with an impression roller and a printing cylinder, which, preferably, is heatable. Also included for each printing unit is an inking assembly with a heater for the ink and also a blade for doctoring the printing screen. The operating temperature of the heater must be adjustable in such a manner, that the ready to print viscosity of the ink is readily achieved. Also included for each printing unit is a cooling device like a cooling roller, whose operating temperature should be adjustable to be below the softening limit of the printed ink. By only this, the over-all printing unit is considerably simplified in comparison to the present state-of-the-art printing units. This holds true especially concerning all the conventional drying periphery. The printing cylinder, which is used by this process, clearly is a unaltered gravure-type cylinder, which is doctored in the usual manner. Clearly too, the printing procedure remains unaltered. However, the special features are to be seen in the inking-technique, the optional heating of the printing cylinder and in the solidification of the imprinted ink instead of drying.

A printing unit, which is suited for the lithographic variant of printing necessarily comprises all the elements described above. Excepted from this is the doctor blade device and also the heater for the ink, which both are optional. The already described advantages concerning "drying", which are inherent to the claimed invention, apply also to this lithographic procedure. A special feature of the lithographic variant, which is made possible by application of the claimed ink, is to be seen in the fact, that the printing cylinder is smooth and that the ink is fluidized directly on the cylinder as a pixel-pattern following the image-screen.

In a first realization of such a printing unit, the ink, which, according to the invention claimed herewith, is solid at room temperature, has been delivered to the printing unit as a precoiled foil. There, it is fed onto the smooth rotating printing cylinder. Preferably, this cylinder is heatable and preferably galvanized with a polished nickel plating, which in turn is screened according to the image to be printed by a state of the art autotypical photoresist-procedure. The autotypical dots themselves are made from plating with black chromium. Otherwise, the autotypical screen can also be made by black-anodizing an aluminum-based printing cylinder by using the well-known photoresist-procedure as well.

These special features allow for the following procedure, by which the prewarmed, but nevertheless mechanically strong ink-foil is spot-heated and fluidized according to the autotypical dot-pattern by means of a highly efficient optical radiation, which is readily converted into fusion-heat at the black spots of the autotypically screened printing cylinder.

This energy input into the ink foil is achieved by means of a continuously radiating light-source, preferably an infrared radiator, which has been placed immediately in front of the impression line between the printing cylinder and the impression roller.

The radiation energy is absorbed and converted into heat by the black autotypical dots only and is reflected and lost without generating heat at the places bare of printing dots. By this selective mechanism, the heating power is transmitted to the ink foil only at the black dots of the backing cylinder. Thus, the ink foil has been fused and fluidized according to the black-dotted image screen and is transferred as image-replica onto the web. The remaining perforated ink-foil, which according to the presumption is still mechanically strong, is stripped off the running printing cylinder or peeled off by means of a doctor-blade and fed back for recycling. The ink dots, which have been fluidized and then transferred to the web, preferably are solidified completely by means of a cooling device. In a second embodiment of such a printing unit, the ink is not delivered as a precoiled foil, but is applied directly to the printing cylinder by means of a foil extruder. The remaining procedure with this second embodiment is identical with the first one. The relevant advantages of this second embodiment as compared to the first one are, that the residual ink, which is stripped off the printing cylinder, may be fed back directly to the extrusion stage and that the direct extrusion produces an ink film on the printing cylinder, which is non-fluid but still warmed and hence is particularly preconditioned for the ensuing selective dot-transfer.

A variant of these both embodiments, which relates to the technique of radiation-input for the dotwise fusion of the ink-foil, operates as follows. The ink-foil is laid down onto the running printing cylinder as a mechanically strong thin film. The printing cylinder is completely unscreened, but has been completely plated with a black-chromium layer or with a black-anodized aluminum layer. Preferably, this printing cylinder is heatable. By these measures, as it is in the first variant of radiative power input, it is ensured, that the energy-conversion is most efficient and that the prewarmed condition of the ink foil is good for speeding up the rapid fluidization of the image pixels. The selective spot-fluidization itself is achieved by optical radiation from at least one laser-beam, which, in its course of sweeping across the ink foil, is pulsed according to the electronically emulated image-screen. Equivalently, the radiative power input may be done from an array of pulsed lasers, which are sweeping across the foil and triggered according to the emulated screens of partial images.

Immediately after having been fluidized by either of these laser devices, the pixels are transferred to the running web. This takes place in the impression zone, where the spot-fluidized ink foil comes into mechanical contact with the running web. The residual ink foil, which then remains with the pixel-perforation on the printing cylinder, is fed back to recycling or to the on-line extrusion-stage. This is the same way as described above.

However, there is a restriction to this second variant of radiative power input. The on-the-fly-sweeping across large images with to day's laser techniques is not fast enough to allow for printing speeds, which are compatible with the speed of modern rotary printing processes. Hence, the domain of the above described pulsed laser-variant of ink-fusion is the so called "imprinter"-technique, where spatially limited but varying parts of a printed page are inserted into the remainder of the page, which is constant for all copies of the print. Examples for this technique are different names of different local merchandisers or locally different prices in an otherwise constant advertising of a globally widespread product. The imprinter process takes advantage from the claimed ink, in that this latter makes possible the application of a multiplexed pulse-laser control. By this multiplexing, the imprint-pattern, that is the imprinter-part of the total image to be printed, may be changed repeatedly "on the fly" during the production run. Clearly contrasting this, imprinting with conventional inks does not allow for such a rapid change, because in this cases, the printing cylinder of the imprinter-unit has to be changed and substituted by a new one every once, a partial imprinted detail of a total image must be altered.

While the above detailed description describes the preferred embodiment of the present invention, the invention is susceptible to modification, variation, and alteration without deviating from the scope and fair meaning of the subjoined claims.

We claim:

1. A printing ink consisting essentially of:

a solid solventless ink such that said ink is printable in a fused fluid condition having a ready-to-print viscosity for a gravure printing method after addition of heat, and said ink being solidifiable by heat extraction after having been printed onto imprinting material;

said ink including an optional colorant and a binding agent having at least two component groups, each component group including at least one member, said members of the first component group having solvent character for said members of the second component group;

wherein said members of the first component group are present as solid phase crystaline materials at ambient temperatures;

wherein said members of the second component group which are polymers are present as viterous, amorphous materials in solid phase at ambient temperature, which are soluble in said molten members of the first component group, and precipitate at a temperature above the melting point of the members of the first component group; and wherein upon heat extraction, the members of the first component group are dissolved as a solid solution in the members of the second component group when these are precipitating from the fused fluid condition.

2. The printing ink according to claim 1, wherein said optional colorant is dispersally portioned at ambient temperature in the first and second components.

3. The printing ink according to claim 2, wherein said optional colorant is soluble in the molten first component group.

4. The printing ink according to claim 2, wherein said optional colorant is a dye-stuff or a pigment.

5. The printing ink according to claim 1, wherein the at least one member of the first component group or a further component is a solid lubricant.

6. The printing ink according to claim 1, wherein the at least one member of the first component group or a further component enhances sliding friction.

7. The printing ink according to claim 1, wherein the weight amount relationship between the first and second component groups is approximately 1:3.

8. The printing ink according to claim 1, wherein the melting of the members of the first component group takes place at approximately 80° C.

9. The printing ink according to claim 1, wherein the precipitation-temperature of the members of the second and, respectively, the members of further component groups in the fused members of the first component group is approximately 100° C.

10. The printing ink according to claim 1, wherein the members of the first component group are cetyl alcohol, stearyl alcohol, 12-hydroxy-stearic acid or combinations thereof.

11. The printing ink according to claim 1, wherein the second component group includes a commercial telomeric acrylic resin enriched with hydroxy-substituents, a partially hydrolyzed polyvinyl acetate or combinations thereof.

12. A method for manufacturing a gravure-printing ink, comprising the steps of:

mixing powder, flakes or pellets of members of a first and second component group, each group including at least one member of which members of the first component group have solvent character for members of the second component group said members of said second group being polymers;

heating the mixture above the melting point of the members of the first component group and up to the solution-temperature of the members of the second component group in the fused members of the first component group;

homogenizing the solution;

cooling to ambient temperature;

solidifying said mixture in molds with ensuing optional fragmentation or pulverization or solidifying as foil or granules.

13. The method according to claim 12, further comprising adding at least one third component which is soluble in the molten first component, before during or after the liquification of the first and second components, said third component being a dye-stuff and/or pigment.

* * * * *